United States Patent [19]
Shaw et al.

[11] 3,932,693
[45] Jan. 13, 1976

[54] LAMINATED PACKAGING FILM HAVING LOW VAPOR AND GAS PERMEABILITY

[75] Inventors: Fred B. Shaw, Hinsdale; Richard E. Graumann, Blue Island, both of Ill.

[73] Assignee: Continental Can Company, Inc., New York, N.Y.

[22] Filed: June 3, 1974

[21] Appl. No.: 475,466

Related U.S. Application Data

[63] Continuation-in-part of Ser. No. 81,941, Oct. 19, 1970, abandoned.

[52] U.S. Cl. .............. 428/518; 428/520; 428/522; 428/212; 426/127; 426/129; 206/46
[51] Int. Cl.² .................................... B32B 27/08
[58] Field of Search ...... 161/81, 941, 247, 252–254, 161/255–256; 428/500, 518, 520, 521, 522

[56] References Cited
UNITED STATES PATENTS

| | | | |
|---|---|---|---|
| 3,524,795 | 8/1970 | Peterson | 161/254 |
| 3,558,330 | 1/1971 | Widiger et al. | 161/254 |
| 3,579,416 | 5/1971 | Schrenk | 161/256 |
| 3,741,253 | 6/1973 | Brax | 428/520 |
| 3,767,523 | 10/1973 | Schwarz | 161/252 X |
| 3,804,705 | 4/1974 | Kishikawa | 161/252 X |

Primary Examiner—George F. Lesmes
Assistant Examiner—Patricia C. Ives
Attorney, Agent, or Firm—Paul Shapiro; Joseph E. Kerwin; William A. Dittmann

[57] ABSTRACT

A laminated film suitable as a food packaging film comprised of a base layer of an oriented polypropylene film, a layer of a vinylidene chloride polymer adhered to one surface of the base layer, a layer of first ethylene/vinyl acetate copolymer having a vinyl acetate content greater than 10 percent by weight adhered to the vinylidene chloride polymer layer and a top layer of a second ethylene/vinyl acetate copolymer having a vinyl acetate content less than 10 percent adhered to the first ethylene/vinyl acetate copolymer layer.

4 Claims, 2 Drawing Figures

INVENTORS
FRED B. SHAW
RICHARD GRAUMANN
BY Paul Shepiro ATT'Y.

LAMINATED PACKAGING FILM HAVING LOW VAPOR AND GAS PERMEABILITY

BACKGROUND OF THE INVENTION

1. Field of the Invention

This application is a continuation-in-part of copending application Ser. No. 81,941 filed Oct. 19, 1970, and now abandoned.

This invention relates to an improved packaging film and more particularly relates to a laminated packaging film having low permeability to gases and a method for the preparation thereof.

2. The Prior Art

Films and other shaped articles of polypropylene have found widespread use as a wrapping and packaging material for many articles of commerce because of their flexibility, transparency, low water vapor permeability and an excellent capability for being heat sealed to provide strong permanent joints.

Although polypropylene films have low water vapor permeability, the films exhibit poor resistance to the permeation or transmission of air and oxygen and for this reason have not found wide application in food packaging where extended shelf-life is a requirement.

Saran coatings which are basically vinylidene chloride polymers containing minor proportions of a copolymerized ethylenically unsaturated monomer such as vinyl chloride or acrylonitrile have the outstanding property in comparison to other synthetic coatings of their excellent resistance to the transmission of oxygen or air. For this reason, it has previously been the practice to coat polypropylene films with either saran emulsions or lacquers. These coatings once applied to the polypropylene films render the films sufficiently impervious to air and oxygen to permit the use of the films for food packaging applications.

The application of saran coatings to polypropylene films has not been without problems. When saran emulsions are employed, at least two coating applications are required in order to eliminate pinholes in the saran coating that is deposited. The resultant high coating weight required when using the emulsions may result in impairment of the impact strength of the coated film. When saran lacquers are employed, the organic solvents used in the lacquers are absorbed by the polypropylene film producing objectionable odors which are difficult to eliminate.

One approach to the solvent absorption problem has been to use lacquers containing extremely volatile solvents and to wind the saran coated polypropylene film into rolls. The rolls are then stored for time periods of at least 48 hours before any further use is made of the coated film. During this storage period, the solvents absorbed from the saran coating operation rapidly permeate the polypropylene film layer and concentrate between the roll windings. After the storage period, the film roll is unwound and subjected to a jet of high velocity air directed on the uncoated side of the polypropylene film layer which effectuates the removal of the absorbed solvent which has permeated out of the film.

It has been found that excellent gas transmission properties can be imparted to polypropylene films with very low coating weights of saran, e.g. in the range of 0.3 to 0.5 pounds per 1000 square feet of film surface, using surface oxidized films fabricated from polypropylene and employing a saran lacquer as the coating medium.

These saran coated polypropylene films cannot, however, without further modification, be employed as packaging films, as the saran layer is easily scratched or damaged during the packaging operation which causes a marked diminution in the gas barrier properties of the coated film. In order to protect the saran coating from damage by packaging operations, attempts have been made to laminate the saran coated polypropylene films to other film substrates such as those fabricated from nylon, polyethylene terephthalate or another polyolefin with the saran layer forming the intermediate layer of the laminate.

In forming the laminated film, an adhesive agent such as synthetic rubber or polyurethane is generally applied in an organic solvent to the second film layer and then combined with the coated side of the saran coated polypropylene immediately after the solvent has been evaporated from the applied adhesive layer. Another method to effect lamination is to extrude a molten layer of nylon or a polyolefin onto the coated side of a saran coated polypropylene, after first priming the saran layer with an organic titanate or a polyurethane.

Although the solvent absorption problem encountered in the saran coating of polypropylene films is substantially eliminated by the roll storage procedure discussed above, the solvent absorption problem is frequently encountered again when the saran coated polypropylene surface is laminated to a second film layer using adhesive solutions. Removal of the absorbed adhesive solvent from the laminated structure is extremely difficult and may not be apparent for several weeks after the structure is fabricated so that when the absorbed solvent slowly permeates through the structure, it can contaminate food stuffs packaged therein.

The problem is particularly severe when the second film layer laminated to the saran coated polypropylene film is a film which has good gas barrier properties such as nylon or polyethylene terephthalate. However, the problem also exists when the second film layer is a polyolefin such as an ethylene/vinyl acetate copolymer, for although the ethylene/vinyl acetate copolymer films are readily permeable to many solvents, it has been found that the solvents such as the aliphatic and aromatic hydrocarbons used in preparing adhesive solutions commonly employed in film laminating operations are generally less volatile than the solvents used in the saran coating operations, and do not readily permeate out of the film during extended storage periods.

SUMMARY OF THE INVENTION

In accordance with the present invention there is provided a laminated film structure having improved gas barrier properties, the structure being comprised of a base layer of an oriented polypropylene film, a continuous layer of a saran polymer coated on one surface of the base layer, a layer of a first ethylene/vinyl acetate copolymer having a vinyl acetate content of greater than 10 percent by weight adhered to the saran layer and a top layer of a second ethylene/vinyl acetate copolymer having a vinyl acetate content less than 10 percent adhered to the first ethylene/vinyl acetate copolymer layer.

The laminated films of the present invention do not require the use of adhesive solutions in their preparation. As no adhesive solutions are employed, there is no requirement for solvent removal during the laminating operation and the problem of solvent absorption is thereby substantially eliminated.

The laminated film structures prepared in accordance with the present invention are substantially free of absorbed quantities of organic solvents and have particular utility as wrapping and packaging materials for foodstuffs and other articles where it is desirable to provide packages having maximum resistance to the permeation of gases.

BRIEF DESCRIPTION OF THE DRAWINGS

With reference to FIGS. 1 and 2, there is illustrated the laminated film product of the present invention generally designated by the reference numeral 10. The laminated film 10 is comprised of a base of layer 11 of oriented polypropylene film.

Figure 1:
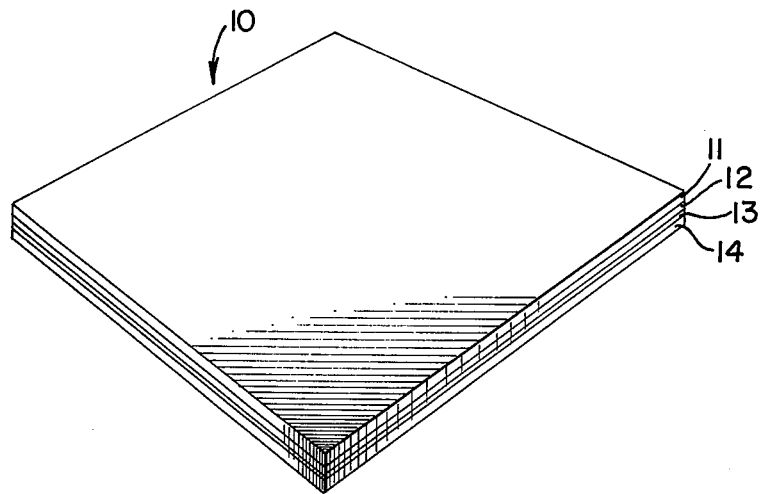
FIG. 1 perspectively depicts a laminate film structure in accordance with the invention.
Figure 2:
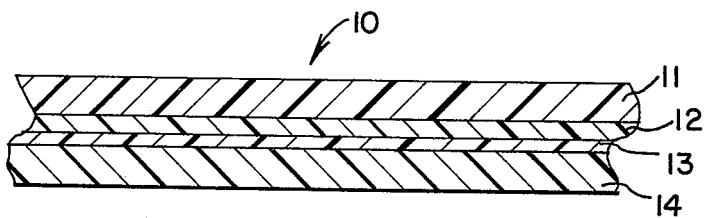
FIG. 2 illustrates the laminate structure of FIG. 1 in fragmentary cross-section.

Laminated films having an oriented polypropylene base layer are especially useful in the packaging of articles having hard and/or sharp projections, such as bones in a loin of beef which may cut through the package when the package is abraded against the shipping container in transit.

Bags made from laminated films having a base layer film of oriented polypropylene are especially useful in the vacuum packaging of meat products. In the vacuum packaging of meat, it is the conventional practice to insert the meat product into a bag formed from a film of heat shrinkable polyethylene or other thermoplastic material, evacuate the air remaining in the bag and then heat sealing the open end of the bag. After heat sealing, the packaged meat product is immersed in a heated bath or passed through a hot air tunnel whereby the unfilled portions of the bag, i.e., the bag areas where the opposed film surfaces contact each other, are caused to fuse to each other and effect a secondary seal around the packaged meat product. Concomittant with the fusion of the contacting film areas, the bag is also caused to shrink into clinging, conforming contact with the packaged meat product. In the event these bags are punctured, as during the handling involved in shipping, the portion of the packaged meat product immediately adjacent to the puncture is exposed to the outside air and begins to discolor and otherwise deteriorate.

Although the gases generated by the air deterioration of the meat would normally cause the bag to expand and balloon in the area of the puncture, because the bag has been shrunk and sealed into a clinging, conforming relationship with the meat product, the bag does not balloon in the area of the puncture and the leak often goes undetected. In contradistinction, when meat is vacuum packed in bags fabricated from laminated films having an oriented polypropylene base layer fabricated in accordance with the present invention, the evacuated heat sealed bags, when subjected to secondary sealing fuse at the exposed contacting film surfaces but do not shrink into clinging, conforming contact with the packaged meat product. In the event these bags are thereafter punctured, the gases generated at the puncture point rapidly cause the bag to balloon thereby providing a highly visible signal that the bag has been punctured thereby enabling the meat packer to immediately repackage the meat before extensive damage has occurred to the packaged product.

Referring again to the drawing, to the polypropylene film layer 11 is deposited a continuous saran coating layer 12 to which is securely bonded, a coating layer 13 of a first ethylene/vinyl acetate copolymer having a vinyl acetate content greater than 10 percent by weight to which is securely bonded a film layer 14 comprised of a second ethylene/vinyl acetate copolymer having a vinyl acetate content less than 10 percent by weight.

It is an essential and critical feature of the present invention that there be applied to the saran coating layer 12, a layer 13 of an ethylene/vinyl acetate copolymer having a vinyl acetate content greater than 10 percent by weight before the applicaton of a film layer 14 of an ethylene/vinyl acetate having a vinyl acetate content less than 10 percent by weight. While it is widely accepted that ethylene/vinyl acetate copolymer resins can be readily extruded in film form, ethylene/vinyl acetate copolymers cannot be successfully extrusion coated onto most substrates because the temperature, e.g. 500°F or more, generally required to achieve good bonding by extrusion coating causes thermal degradation of the ethylene/vinyl acetate copolymer resin. It has been found that ethylene/vinyl acetate copolymer resins having a vinyl acetate content greater than 10 percent can be successfully extrusion coated onto saran substrates with good bonding at melt temperatures in the range of 425° to 475°, which temperatures are substantially below that at which such resins decompose namely, 500°F. However, ethylene/vinyl acetate copolymer substrates having a vinyl acetate content greater than 10 percent by weight are impractical as an outer ply for a film laminate used in packaging applications because of the tacky nature of the applied resin. For example, bags or pouches fabricated from such a laminated film, wherein the ethylene/vinyl acetate copolymer forms the interior surface of the bag or pouch are practically impossible to open. When this copolymer forms the exterior surface of the bag, the individual bags have such poor slip properties that they are difficult to handle on packaging machinery. Laminating a film or other sheetlike structure 14 fabricated from an ethylene/vinyl acetate copolymer having a vinyl acetate content of less than 10 percent by weight to the ethylene/vinyl acetate coating layer 13 having a vinyl acetate content greater than 10 percent by weight eliminates the problems encountered with the tacky resin and provides a gas impermeable laminated film which is heat sealable in the conventional manner.

It is a further critical feature of the present invention that the film layer 14 laminated to the tacky ethylene/vinyl acetate copolymer layer 13 be a ethylene/vinyl acetate copolymer film. If it is attempted to laminate a film layer to the coating layer 13 which does not contain vinyl acetate as for example a polyolefin homopolymer film layer, the extrusion temperatures required for effective bonding of the two layers causes deleterious odor producing decomposition of the ethylene/vinyl acetate copolymer layer 13.

The oriented polypropylene film which is employed as the base layer suitably has a thickness between about 0.4 and 10 mils and preferably between about 0.5 and 3.0 mils. Advantageously, a biaxially oriented polypropylene film layer is employed.

Saran coating materials utilized for the purposes of the present invention and applied to the based film are vinylidene chloride copolymers containing from about 70 to 95 percent by weight and preferably, from about 80 to 92 percent by weight vinylidene chloride, and correspondingly from from 5 to 30 percent by weight and preferably about 8 to 20 percent by weight, of one or more ethylenically unsaturated monomers polymerizable therewith. Copolymerizable monomers include vinyl chloride, acrylonitrile, acrylic acid esters, methacrylic acid esters, maleic acid esters fumaric acid esters, itaconic acid esters, the alcohol constituents of these esters containing 1–6 carbon atoms, methyl vinyl ketone, vinyl acetate, styrene, dichlorovinylidene fluoride, butadiene, chlorobutadiene, isoprene and vinyl pyridine.

In order to achieve a substantial bond between the polypropylene base film and the saran coating, it has been found beneficial to treat the polypropylene film surface to be coated according to any of a number of a conventional surface oxidation techniques. Satisfactory surface treatment may be accomplished by the well-known electrical discharge or corona discharge techniques as for example disclosed in U.S. Pat. No. 2,810,933 or British Patent No. 715,914 or chemical oxidation as for example with chromic acid (U.S. Pat. No. 2,668,134), ozone (U.S. Pat. No. 2,715,075) or flame treatment U.S. Pat. No. 2,632,921).

The coating application of the saran polymer may be conveniently made by spraying or spread coating a solution or dispersion thereof on the surface of the oxidized polypropylene base film, application from an etched or engraved cylinder being preferred. In this connection, a relatively volatile solvent for the saran polymer is employed in order to obtain rapid drying of the applied saran coating and to insure the rapid permeation of any retained solvent through the base film to facilitate its eventual removal as described above. Solvents generally employed include acetone, methyl ethyl ketone and ethyl acetate. In preparing the saran coating solutions, the solvent content is maintained in the range of about 15 to 35 percent by weight saran polymer.

The saran coating applied to the surface oxidized polypropylene base film is advantageously applied at a coating weight in the order of 0.3 to 0.4 pounds per 1000 square feet of substrate surface. After the coating solution is applied to the oriented polypropylene film substrate, the solvent is removed therefrom, preferably at temperatures in the range of 150° to 200°F and forced draft conditions. The dried coated film is stored for at least 48 hours, preferably in roll form, and then unwound and exposed to a stream of air to effect removal of any solvent residuim resulting from the saran coating application. The saran coated side of this film is then laminated to the first and second ethylene/vinyl acetate copolymer layers by any suitable means.

Advantageously the laminated films of the present invention are prepared using sandwich lamination techniques wherein separate webs of the saran coated polypropylene and second ethylene/vinyl acetate copolymer are passed and directed to converge beneath an extruder die from which a molten layer of the first ethylene/vinyl acetate copolymer is continuously extruded at a temperature of 425°–475°F. The first ethylene/vinyl acetate copolymer is extruded between the two converging webs in such a manner that a continuous molten layer of the first ethylene/vinyl acetate copolymer simultaneously contacts and adheres to the saran coated surface of the polypropylene web and the opposed surface of the second ethylene/vinyl acetate web. The converged webs containing the intermediate first ethylene/vinyl acetate copolymer are then passed between the nip of a pair of cooperating rolls wherein the molten layer is chilled, solidified and laminated to the separate webs by the action of the rolls of which at least one is maintained at a temperature below the fusion temperature of the first ethylene/vinyl acetate copolymer.

Generally the first ethylene/vinyl acetate copolymer layer is a copolymer containing from 10 to 30 weight percent vinyl acetate and from 70 to 90 weight percent ethylene and preferably 16 to 22 weight percent vinyl acetate and 78 to 84 percent ethylene. This extruded first ethylene/vinyl acetate copolymer layer may vary in thickness from 0.3 to 4.0 mils, the preferred range of the first ethylene/vinyl acetate copolymer coating thickness ranging from 0.5 to 2.0 mils.

The second ethylene/vinyl acetate copolymer web is prepared from an ethylene/vinyl acetate copolymer having a vinyl acetate content less than 10 percent by weight and advantageously has a vinyl acetate content between 1 and 10 percent by weight and ethylene content between 90 and 99 percent by weight and preferably a vinyl acetate content between 2.5 and 7.5 percent by weight and an ethylene content between 92.5 and 97.5 percent by weight. The film of the second ethylene/vinyl acetate copolymer employed in preparing the laminates of the present invention has a thickness between 0.5 ad 10 mils and preferably between about 0.5 and 2 mils.

Stabilizers, lubricants, slip agents, plasticizers, dyes, pigments, antistatic agents and fillers can be incorporated on any layer of the laminate film when required.

The laminated film products of the present invention are possessed of strong and effective bonds between the various layers that make up the laminated structure. In most instances, the joined layers are extremely difficult, if not impossible to strip apart or delaminate by ordinary physical methods.

The laminated film products of the present invention are capable of being joined or thermally welded by conventional heat sealing techniques and have particular utility as wrapping and packaging materials for foodstuffs and for other articles such as pharmaceuticals medicinal products and the like when it is desired to protect the packaged article from the unwanted effects of moisture and oxygen.

Certain preferred embodiments of the invention and a method of preparation of the laminate films of the present invention are illustrated in the following Example.

EXAMPLE

A commercially available saran emulsion coated biaxially oriented polypropylene film having a total thickness of 1.0 mils (Hercules Company's HB 500) was sandwich extrusion laminated to an ethylene/vinyl acetate copolymer film containing 6% by weight vinyl acetate having a thickness of 1.25 mils by means of an extruded ethylene/vinyl acetate copolymer having a vinyl acetate content of 20 weight percent. The extruder and die temperature were adjusted in such a manner that the melt exiting from the die had a temperature of 450°F. The thickness of the ethylene/vinyl acetate copolymer extrusion ply was 1.5 mils.

The finished laminated film had the following properties:

| | | |
|---|---|---|
| Oxygen Transmission Rate | (cc/100 sq.in./24 hrs.) | 1.1 |
| Moisture Transmission Rate | (g/100 sq.in./24 hrs.) | 0.15 |
| Puncture Resistance | (Beach Test-ASTM D781 | 17.0 (inch-lbs.) |
| Clarity | (Gardner) | 14.0 |
| Heat Seal Range | (Back-to-Back) | 275 thru 400°F. |
| Heat Seal Strength | (B/B,350°F.,40 psi ½ sec.) | 4800 grams/in. |

What is claimed is:

1. A laminated, heat sealable film having low oxygen and water vapor permeability comprising
   a. a base layer, of an oriented polypropylene film
   b. a thin continuous layer of a vinylidene chloride polymer containing at least 75 weight percent vinylidene chloride bonded to one surface of the base layer,
   c. a thin continuous layer of a first ethylene/vinyl acetate copolymer bonded to the vinylidene polymer layer, the first ethylene/vinyl acetate copolymer having a vinyl acetate content greater than 10 to about 30 percent by weight, and
   d. a top layer of a second ethylene/vinyl acetate copolymer having a vinyl acetate content of about 2.5 to 7.5 percent by weight bonded to the first ethylene/vinyl acetate copolymer layer.

2. The laminated film of claim 1 wherein the polypropylene based layer is a biaxially oriented film layer.

3. The laminated film of claim 1 wherein the vinylidene chloride polymer is a copolymer containing 75 to 92 percent by weight of vinylidene chloride and 8 to 25 percent by weight of a copolymerizable ethylenically unsaturated monomer.

4. The laminated film of claim 1 wherein the polypropylene base layer is surface oxidized before application of the vinylidene polymer layer.

* * * * *